United States Patent
Simpkins et al.

(10) Patent No.: US 7,435,275 B2
(45) Date of Patent: Oct. 14, 2008

(54) SYSTEM AND METHOD OF HEATING AN EXHAUST TREATMENT DEVICE

(75) Inventors: Haskell Simpkins, Grand Blanc, MI (US); Joseph V. Bonadies, Clarkston, MI (US); David A. Goulette, Marine City, MI (US); Kenneth S. Price, Brighton, MI (US); John E. Kirwan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/203,059

(22) Filed: Aug. 11, 2005

(65) Prior Publication Data

US 2007/0033872 A1 Feb. 15, 2007

(51) Int. Cl.
| | |
|---|---|
| C01B 3/36 | (2006.01) |
| C10J 3/46 | (2006.01) |
| C10J 3/54 | (2006.01) |
| B01D 50/00 | (2006.01) |
| B01D 53/34 | (2006.01) |
| F01N 3/00 | (2006.01) |
| F01N 3/20 | (2006.01) |
| F23J 11/00 | (2006.01) |
| G05B 1/00 | (2006.01) |

(52) U.S. Cl. .................. 48/197 R; 422/105; 422/168
(58) Field of Classification Search .............. 48/197 R; 60/300
See application file for complete search history.

(56) References Cited

U.S. PATENT DOCUMENTS

| | | | |
|---|---|---|---|
| 2,898,202 A | 8/1959 | Houdry et al. | |
| 3,370,914 A | 2/1968 | Gross et al. | |
| 4,576,617 A | 3/1986 | Renevot | ................. 55/96 |
| 5,272,871 A | 12/1993 | Oshima et al. | ................. 60/274 |
| 5,322,671 A | 6/1994 | Shustorovich et al. | ...... 422/176 |

(Continued)

FOREIGN PATENT DOCUMENTS

DE 19543219 C1 12/1996

(Continued)

OTHER PUBLICATIONS

Japanese Patent No. JP406117224A; Publication Date: Apr. 26, 1994; Abstract Only (1 page).

*Primary Examiner*—Alexa D Neckel
*Assistant Examiner*—Matthew J Merkling
(74) *Attorney, Agent, or Firm*—Paul L. Marshall

(57) ABSTRACT

In one embodiment, a method of heating an exhaust treatment device can comprise: generating reformate in a reformer, wherein the reformate comprises hydrogen; introducing oxygen to the reformate prior to combining the reformate with another stream; combusting a portion of the reformate and generating an exotherm to form heated reformate; and introducing the heated reformate to the exhaust treatment device. In one embodiment the exhaust system can comprise: a reformer; a reformate conduit disposed in physical communication with a reformate outlet of the reformer; an exhaust treatment device disposed in fluid communication with the reformer; and an oxygen supply disposed in fluid communication with the reformate conduit such that oxygen can be introduced into the reformate conduit upstream of a reformate conduit outlet, wherein the reformate conduit outlet is disposed in physical communication with an exhaust conduit and/or the exhaust treatment device.

11 Claims, 4 Drawing Sheets

U.S. PATENT DOCUMENTS

| | | | |
|---|---|---|---|
| 5,406,790 A | 4/1995 | Hirota et al. | 60/276 |
| 5,412,946 A | 5/1995 | Oshima et al. | 60/286 |
| 5,437,153 A | 8/1995 | Takeshima et al. | 60/276 |
| 5,472,673 A | 12/1995 | Goto et al. | 422/169 |
| 5,473,890 A | 12/1995 | Takeshima et al. | 60/285 |
| 5,543,124 A | 8/1996 | Yokota et al. | 423/239.1 |
| 5,551,231 A | 9/1996 | Tanaka et al. | 60/289 |
| 5,586,433 A | 12/1996 | Boegner et al. | 60/274 |
| 5,606,856 A | 3/1997 | Linder et al. | 60/286 |
| 5,657,625 A | 8/1997 | Koga et al. | 60/274 |
| 5,711,149 A | 1/1998 | Araki et al. | 60/278 |
| 5,727,385 A | 3/1998 | Hepburn | 60/297 |
| 5,746,989 A | 5/1998 | Murachi et al. | 423/212 R |
| 5,768,888 A | 6/1998 | Matros et al. | 60/278 |
| 5,850,735 A | 12/1998 | Araki et al. | 60/274 |
| 5,853,684 A | 12/1998 | Fang et al. | 423/244.1 |
| 5,894,725 A | 4/1999 | Cullen et al. | 60/274 |
| 5,921,076 A | 7/1999 | Krutzsch et al. | 60/274 |
| 5,953,908 A * | 9/1999 | Appleby | 60/275 |
| 6,122,909 A | 9/2000 | Murphy et al. | 60/286 |
| 6,125,629 A | 10/2000 | Patchett | 60/286 |
| 6,170,259 B1 | 1/2001 | Boegner et al. | 60/286 |
| 6,176,078 B1 | 1/2001 | Balko et al. | 60/274 |
| 6,199,374 B1 | 3/2001 | Hirota et al. | 60/277 |
| 6,199,375 B1 | 3/2001 | Russell | 60/286 |
| 6,237,326 B1 | 5/2001 | Russell | 60/274 |
| 6,247,303 B1 | 6/2001 | Broer et al. | 60/274 |
| 6,253,543 B1 | 7/2001 | Russell | 60/274 |
| 6,260,353 B1 | 7/2001 | Takahashi | 60/286 |
| 6,269,633 B1 | 8/2001 | van Nieuwstadt et al. | 60/277 |
| 6,272,848 B1 | 8/2001 | Okude et al. | 60/274 |
| 6,293,094 B1 | 9/2001 | Schmidt et al. | 60/284 |
| 6,293,096 B1 | 9/2001 | Khair et al. | 60/286 |
| 6,301,882 B1 | 10/2001 | Manaka | 60/285 |
| 6,324,834 B1 | 12/2001 | Schnaibel et al. | 60/274 |
| 6,354,078 B1 | 3/2002 | Karlsson et al. | 60/274 |
| 6,502,391 B1 | 1/2003 | Hirota et al. | 60/288 |
| 6,524,550 B1 * | 2/2003 | Chintawar et al. | 423/650 |
| 6,560,958 B1 | 5/2003 | Bromberg et al. | 60/275 |
| 6,608,463 B1 * | 8/2003 | Kelly et al. | 320/101 |
| 6,655,130 B1 | 12/2003 | Kirwan et al. | 60/284 |
| 6,871,790 B2 | 3/2005 | Kaupert et al. | 237/12.3 |
| 6,976,353 B2 * | 12/2005 | Daniel et al. | 60/275 |
| 2001/0004832 A1 | 6/2001 | Hanaki et al. | 60/286 |
| 2001/0039798 A1 | 11/2001 | Pott | 60/278 |
| 2001/0041153 A1 | 11/2001 | Benz | 422/169 |
| 2003/0101713 A1 | 6/2003 | Dalla Betta et al. | 60/284 |
| 2003/0140622 A1* | 7/2003 | Taylor et al. | 60/295 |
| 2004/0098977 A1 | 5/2004 | Kupe et al. | 60/286 |
| 2004/0115490 A1 | 6/2004 | Kaupert et al. | 429/13 |
| 2004/0144083 A1* | 7/2004 | Ament | 60/286 |
| 2005/0022450 A1 | 2/2005 | Tan et al. | 48/198.3 |

FOREIGN PATENT DOCUMENTS

| | | |
|---|---|---|
| JP | 06117224 A | 4/1994 |
| JP | 06336914 | 12/1994 |
| WO | WO 01/14698 A1 | 3/2001 |
| WO | WO 2004/071646 A2 | 8/2004 |

* cited by examiner

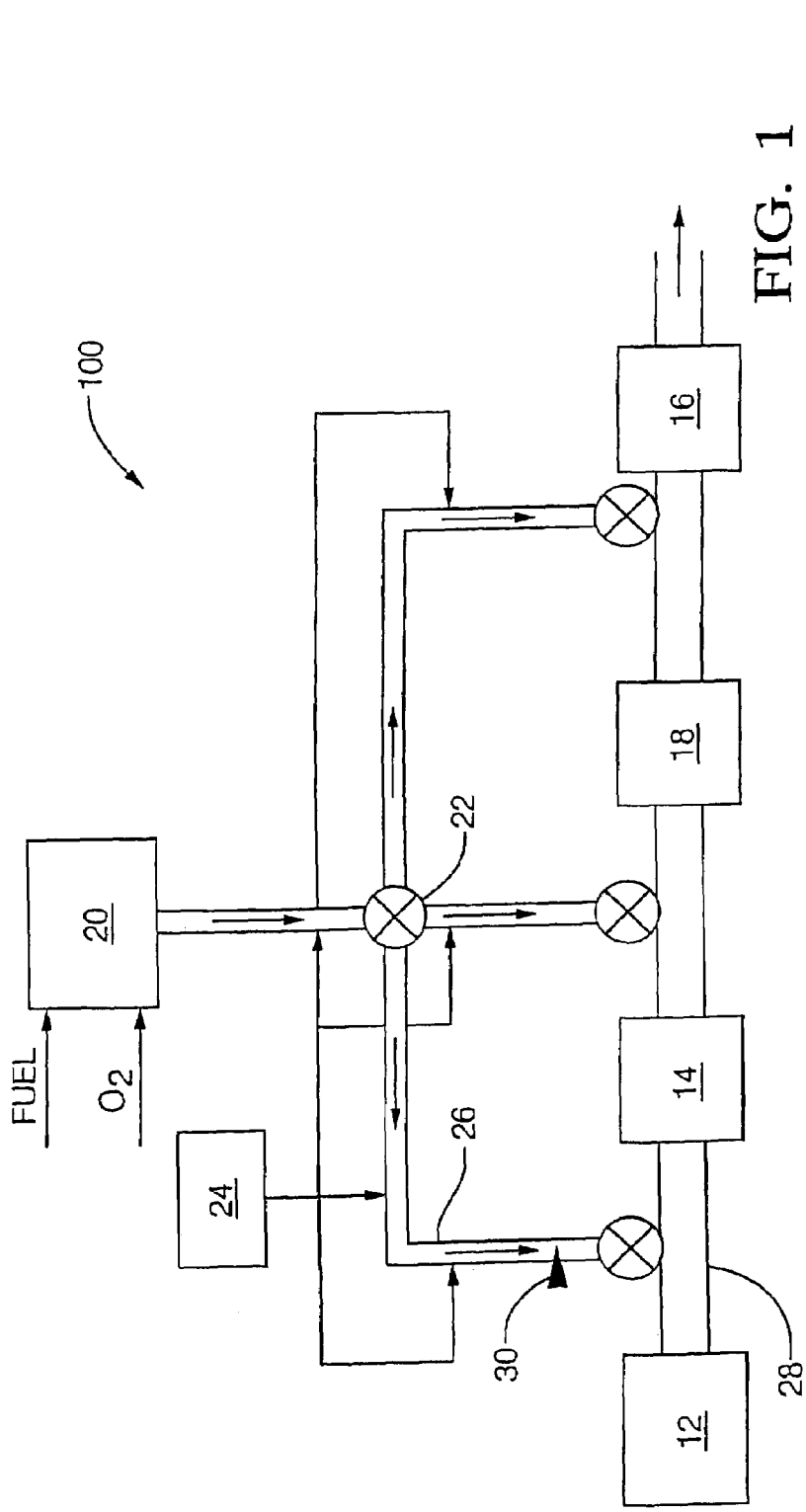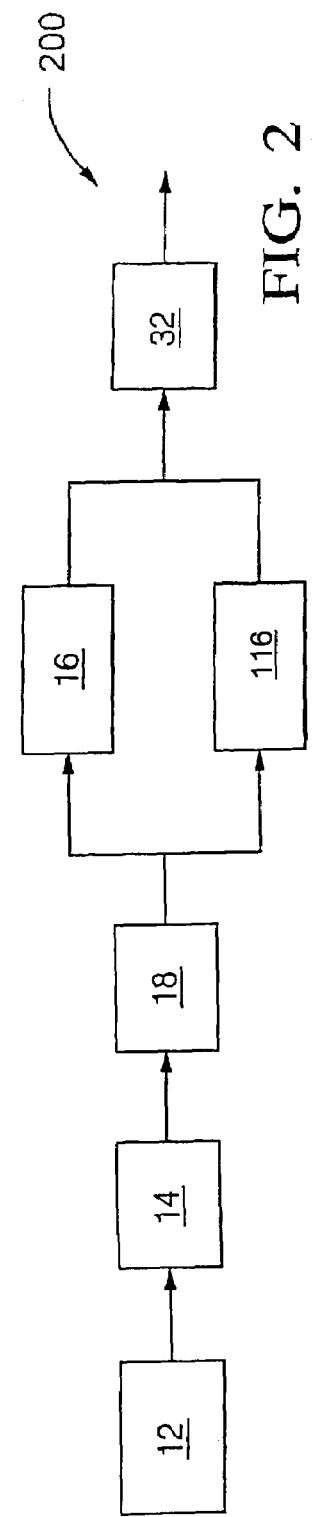
FIG. 1
FIG. 2

SYSTEM AND METHOD OF HEATING AN EXHAUST TREATMENT DEVICE

BACKGROUND

Federal and state governments have enacted progressive laws and regulations that impose ever-increasing restrictions on motor vehicles in the areas of exhaust emissions and improved fuel economy. For example, the California regulations include Super Ultra Low Emission Vehicle (SULEV) emission standards. It is noted that SULEV emission standards are particularly more stringent on hydrocarbon (HC) and nitrogen oxides ($NO_X$) (e.g., nitric oxide (NO), nitrogen dioxide ($NO_2$), nitrous oxide ($N_2O$), and the like) emissions. Moreover, as this trend of increasingly restrictive emissions continues, Zero Emission Vehicle (ZEV) standards are eventually going to become the standard for exhaust gaseous emissions.

In order to meet exhaust gaseous emission standards, the exhaust gas emitted from internal combustion engines can be treated prior to emission into the atmosphere. Exhaust gases can be routed through an exhaust treatment device disposed in fluid communication with the exhaust outlet system of the engine, wherein the exhaust gas can be treated, for example, by reactions employing a catalyst. Examples of exhaust treatment devices include catalytic converters, catalytic absorbers/adsorbers (e.g., $NO_X$ adsorber), diesel particulate traps, non-thermal plasma conversion devices, oxidation catalyst devices, selective catalytic reduction (SCR) devices, and the like).

However, these exhaust treatment devices generally can have a temperature window in which the device is designed to optimally perform. During start-up conditions, exhaust gas can pass untreated through the exhaust treatment device, since the temperature in the exhaust treatment device can be below the temperature window. As such, start-up emissions can attribute a significant amount of the total allowed cumulative emissions. Further, during some instances of normal operation (e.g., idle conditions, low speed/load points, and the like), the temperature of the exhaust gas can drop below the temperature window of the exhaust treatment device, which can further allow exhaust gas to pass untreated through the exhaust treatment device.

Therefore, what are needed in the art are systems and methods that can allow rapid heating of the exhaust treatment device, and that can allow the desired temperature window of the exhaust treatment device to be maintained.

SUMMARY

Disclosed herein are systems and methods of operating an exhaust system.

In one embodiment, a method of heating an exhaust treatment device can comprise: generating reformate in a reformer, wherein the reformate comprises hydrogen; introducing oxygen to the reformate prior to combining the reformate with another stream; combusting a portion of the reformate and generating an exotherm to form heated reformate; and introducing the heated reformate to the exhaust treatment device.

In one embodiment the exhaust system can comprise: a reformer; a reformate conduit disposed in physical communication with a reformate outlet of the reformer; an exhaust treatment device disposed in fluid communication with the reformer; and an oxygen supply disposed in fluid communication with the reformate conduit such that oxygen can be introduced into the reformate conduit upstream of a reformate conduit outlet, wherein the reformate conduit outlet is disposed in physical communication with an exhaust conduit and/or the exhaust treatment device.

The above-described and other features will be appreciated and understood by those skilled in the art from the following detailed description, drawings, and appended claims.

BRIEF DESCRIPTION OF THE DRAWINGS

Refer now to the figures, which are exemplary embodiments, and wherein the like elements are numbered alike.

FIG. 1 is a schematic illustration of one embodiment of an exhaust treatment system.

FIG. 2 is a schematic illustration of another embodiment an exhaust treatment system illustrating a parallel arrangement of exhaust treatment devices.

DETAILED DESCRIPTION

Figure 3:
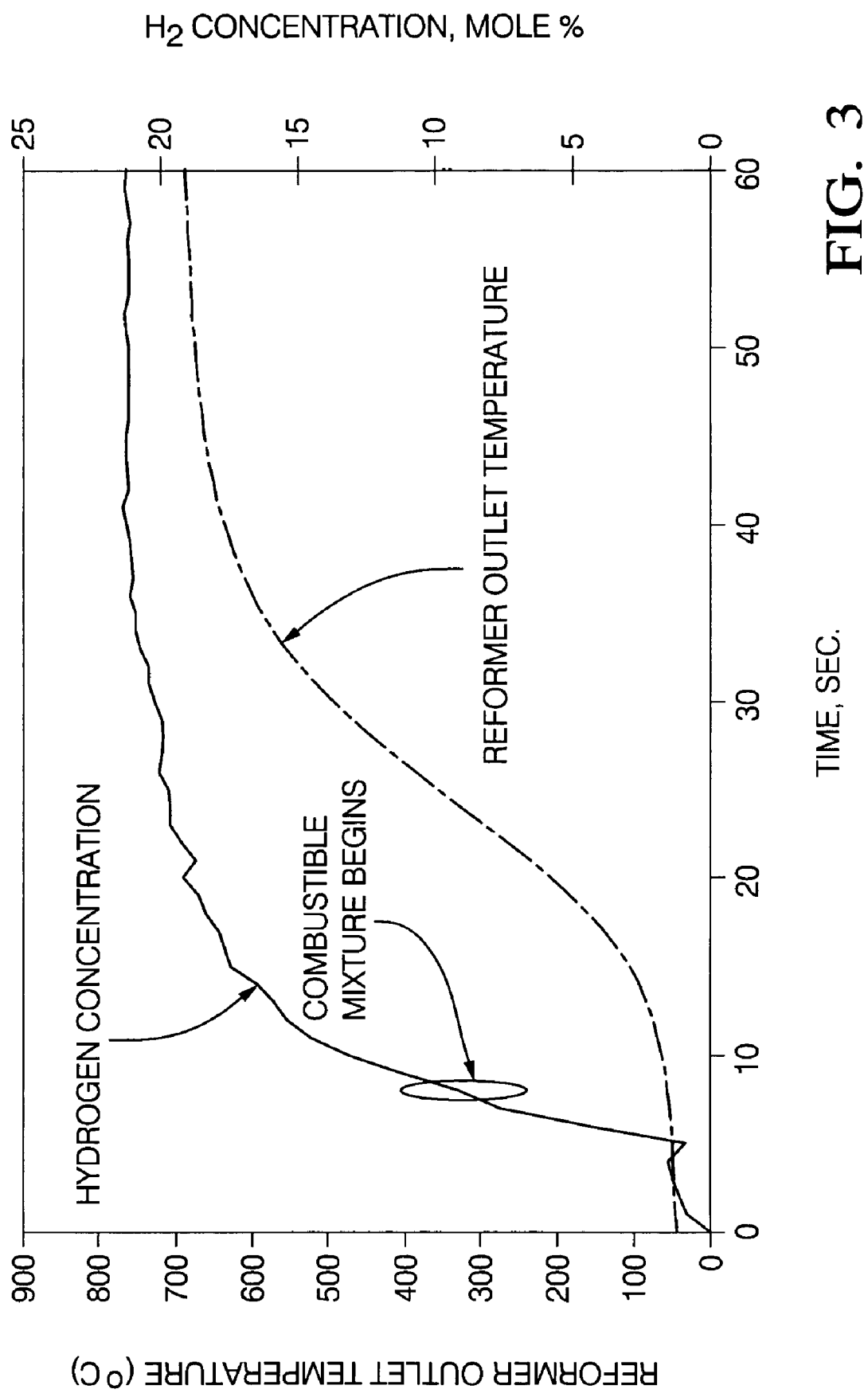
FIG. 3 is a graphical representation of hydrogen ($H_2$) production rate and reformer outlet temperature while cold-starting a reformer during a bench test.

Disclosed herein are systems and methods that can allow rapid heating of an exhaust treatment device, and that can allow the desired temperature window of the exhaust treatment device to be maintained (i.e., allows for "temperature leveling" of the exhaust treatment device). More particularly, it has been discovered that an oxygen source can be introduced into a reformate conduit to burn reformate from a reformer to generate heat, which can be used to heat the exhaust treatment device. Oxygen (e.g., air) introduction into the reformate stream (prior to the reformate stream entering the exhaust conduit) can be used to control the reformate temperature, and hence to heat and/or maintain the temperature of various exhaust treatment devices. Reformate exiting a reformer has an initial temperature (e.g., about 600° C. to about 700° C.). As the reformate passes through a conduit toward the exhaust conduit and/or an exhaust treatment device, the reformate cools. The introduction of oxygen to the reformate conduit, for example, prior to the reformate cooling to below a self-ignite temperature (e.g., a temperature at which the reformate will ignite without the use of an ignition device), causes an exotherm. The amount of heat generated can be controlled based upon the amount of oxygen introduced to the reformate stream. Hence, it is possible to heat exhaust treatment device(s), e.g., during start-up, and to maintain the temperature of exhaust treatment device(s) (e.g., during idle conditions, low speed periods, low load periods, deceleration, and/or the like).

It should first be noted that the reformer disclosed herein can readily be adapted for use in any system where hydrocarbon fuels are processed to hydrogen or less complex hydrocarbons, such as a fuel cell system (e.g., solid oxide fuel cell (SOFC) system, proton exchange membrane (PEM) system, and the like), an internal combustion engine system (e.g., an engine system fueled with diesel fuel, gasoline, and the like), chemical processes employing hydrogen as a reactant, and the like. Additionally, it is noted that the reformer can be employed in stationary applications and can desirably also be employed in mobile applications, e.g., "on-board" applications.

Several combinations of exhaust treatment devices are discussed hereunder with references to individual figures. One of skill in the art will easily recognize that many of the devices of each of the embodiments are similar to or identical to each other. These various devices can be added or omitted based on various design choices. As such, various elements and/or features can be introduced in a given figure with the understanding that the systems can be modified as taught herein to include features illustrated in other embodiments. Each of these elements is first introduced in the discussion of a given figure, but is not repeated for each embodiment. Rather, distinct structure is discussed relative to each figure/embodiment.

Referring now to FIG. 1, an exemplary exhaust treatment system generally designated 100 is illustrated (hereinafter referred to as "system 100"). While the location, type, number, and size, of each component can vary depending on the application, this figure provides a starting point for discussion. An exhaust gas source 12 can be disposed upstream of and in fluid communication with at least one exhaust treatment device (e.g., an oxidation catalyst device 14, a $NO_X$ adsorber device 16, a particulate filter 18, sulfur trap (not shown), plasma reactor (not shown), selective reduction catalyst 32 (see FIG. 2), and the like, as well as combinations comprising at least one of the foregoing devices). That is, the flow direction of the stream in the exhaust conduit 28 is from the exhaust source 12 to the exhaust treatment device(s). For example, the exhaust gas source 12 can be disposed upstream of and in fluid communication with an in-line oxidation catalyst device 14, an in-line $NO_X$ adsorber device 16, and/or an in-line particulate filter 18 (i.e., the "in-line" devices are in the line of the exhaust flow). In a particular embodiment, the $NO_X$ adsorber device 16 can be disposed downstream of and in fluid communication with the oxidation catalyst device 14, and downstream of and in fluid communication with the particulate filter 18, while the particulate filter 18 can be disposed between the oxidation catalyst 14 and $NO_X$ adsorber device 16.

A reformer 20, which can be an on-board, off-line reformer (i.e., a reformer that is not in line to receive the exhaust flow from the exhaust source), can be disposed in selective fluid communication with any of the exhaust treatment devices, e.g., via valve 22, directly to the devices and/or via exhaust conduit 28. The term "on-board" is used herein to refer to the production of a given component within a vehicle (e.g., automobile, truck, and the like). However, embodiments are envisioned where exhaust gas recycle (EGR) can be delivered to the reformer to increase hydrogen output in the reformer as discussed in U.S. Published Patent Application No. 20050022450 to Tan et al., thereby making the reformer a periodic "in-line" component of the system 100.

The reformer 20 can generate reformate comprising primarily hydrogen and carbon monoxide along with byproducts (e.g., methane ($CH_4$), inert materials (e.g., nitrogen ($N_2$), carbon dioxide ($CO_2$), and water ($H_2O$)), and the like). It is noted that the inert materials can initially be present in air, which can be used as an oxygen source for reforming. The reformer 20 can be configured for partial oxidation reforming, steam reforming, dry reforming, and the like, as well as combinations comprising at least one of the foregoing. In an embodiment, reformer 20 can be configured primarily for partial oxidation reforming. However, it is noted that steam reforming and dry reforming can also occur to the extent of the water and carbon dioxide are contained in the air and fuel.

Partial oxidation reformers are based on substoichiometric combustion to achieve the temperatures sufficient to reform the fuel. Chemical "decomposition" of the fuel to synthesis gas (i.e., a gas comprising principally hydrogen and carbon monoxide) can occur through thermal reactions at high temperatures, e.g., about 700° C. to about 1,200° C. Catalysts have been demonstrated with partial oxidation systems (catalytic partial oxidation) to promote conversion of various fuels into synthesis gas. The use of a catalyst can result in acceleration of the reforming reactions and can provide this effect at lower reaction temperatures than those that would otherwise be needed in the absence of a catalyst. An example of the partial oxidation reforming reaction is as follows:

$$CH_4 + \tfrac{1}{2}O_2 \rightarrow CO + 2H_2 + \text{heat} \qquad (I)$$

Steam reforming involves the use of a fuel and steam ($H_2O$) that can be reacted in heated tubes filled with a catalyst(s) to convert the hydrocarbons into synthesis gas. The steam reforming reactions are endothermic, thus the steam reformers can be designed to transfer heat into the catalytic process. An example of the steam reforming reaction is as follows:

$$CH_4 + H_2O \rightarrow CO + 4H_2 \qquad (II)$$

Dry reforming involves the creation of synthesis gas in the absence of water, for example, using carbon dioxide as the oxidant. Dry reforming reactions, like steam reforming reactions, are endothermic processes. An example of the dry reforming reaction is depicted in the following reaction:

$$CH_4 + CO_2 \rightarrow 2CO + 2H_2 \qquad (III)$$

Practical reformers can comprise a combination of these idealized processes. Thus, a combination of air, water, and/or recycled exhaust fluid can be used as the oxidant in the fuel reforming process.

Reformer 20 can comprise a substrate disposed in a housing, wherein a catalyst metal and support material can be disposed on the substrate. Suitable reformers 20 include, but are not limited to, those reformers disclosed in International Application No. PCT/US04/04093 (Published Application No. WO2004071646) to Kupe et al. Suitable fuels used for the reforming process include, but are not limited to, various hydrocarbon fuels, such as diesel fuel, gasoline, and the like.

The substrate of the reformer 20 can be capable of operating at temperatures up to about 1,400° C.; capable of withstanding strong reducing environments in the presence of water containing, for example, hydrocarbons, hydrogen, carbon monoxide, water, oxygen, sulfur and sulfur-containing compounds, combustion radicals, such as hydrogen and hydroxyl ions, and the like, and carbon particulate matter; and has sufficient surface area and structural integrity to support the desired catalyst metal and support material. Suitable materials that can be used as the substrate of the reformer 20 include, zirconium toughened aluminum oxide, titanium toughened aluminum oxide, aluminum oxide, zirconium oxide, titanium oxide, as well as oxides, alloys, cermets, and the like, as well as combinations comprising at least one of the foregoing materials.

Suitable catalyst metals for reformer 20 include those discussed above in relation to oxidation catalyst device 14. In an embodiment, the catalytic metals for reformer 20 can comprise rhodium and platinum. Support materials for the reformer 20 can include, but are not limited to, hexaaluminates, aluminates, aluminum oxides (e.g., gamma-aluminum oxide, theta-aluminum oxide, delta-aluminum oxide), gallium oxides, zirconium oxides and titanium oxides.

In operation, reformate from the reformer 20 reacts the fuel with oxygen to produce the reformate. At various points during the operation of the system, at least a portion of the reformate is combusted by introducing oxygen to the reformate. The oxygen can be reacted with the reformate within the reformate conduit 26. The oxygen source 24 can be the same source employed to provide oxygen to the reformer 20

(e.g., air), a separate oxygen source (e.g., air), and/or a portion of exhaust gas (e.g., if it contains sufficient oxygen), and the like. The flow rate of the oxygen into the reformate stream can be controlled such that the heat generated does not exceed the design limits of the system components (e.g., the conduit(s) and the exhaust treatment device(s)). Particularly, the exotherm generated by the combustion of reformate can be sufficient to bring an exhaust treatment device up to its operating temperature window, up to its cleaning/maintenance temperature window, maintain a temperature window, and/or otherwise control the temperature of the exhaust treatment device. For example, sufficient oxygen can be introduced to the reformate conduit to combust about 2 vol. % to about 20 vol. % of the reformate, or, more specifically, about 3 vol % to about 15 vol % of the reformate, or, even more specifically, about 5 vol. % to about 10 vol. % of the reformate, based upon a total volume of the reformate.

Introduction point(s) of the oxygen to the reformate conduit can be based upon the environmental conditions under which the system will be employed (e.g., in a warm environment (e.g., low temperatures of greater than or equal to about 40° F.) or in a cold environment (e.g., low temperatures of less than or equal to about negative 40° F.)). Optionally, multiple introduction point(s) can be employed in conjunction with temperature sensor(s), in order to determine the desired introduction point based upon the temperature of the reformate. For simplicity and efficiency, it is desirable to introduce the oxygen to the reformate stream at a point where the reformate stream is at a sufficient temperature such that the introduction of the oxygen with cause self-ignition. Hence, the location of: the reformer 20 in the system, the oxygen introduction points to the reformate conduit 26, the introduction point of the reformate to the exhaust stream and/or exhaust treatments devices, can all be chosen for thermodynamic efficiency.

Alternatively, or in addition, optional igniter(s) 30 (e.g., a spark plug, glow plug, and the like) can strategically be disposed into the reformate conduit so as to be capable of igniting the exothermic reaction. The igniter 30 can be particularly useful as a back up device, under operating conditions where the reformer 20 has not reached its full operating temperature (e.g., during start-up conditions), and/or in cold environments.

Referring now to FIG. 2, a simplified exhaust treatment system 200 is illustrated. The system 200 is provided to illustrate that components of the system 200 can be arranged in series and/or in parallel. For example, the $NO_X$ adsorber device 16 can be arranged in parallel with a second $NO_X$ adsorber device 116. Without being bound by theory, a parallel configuration can advantageously allow selective regeneration of the components (devices) of the system 200. Suitable types and arrangements of exhaust treatment devices include, but are not limited, to those discussed in International Application No. PCT/US04/04093 (Published Application No. WO2004071646) to Kupe et al.

With regards to exhaust gas source 12, suitable exhaust gas sources can include compression ignition engines, spark ignition engines, and the like. In a particular embodiment, the exhaust gas source 12 can be a compression ignition engine operating with diesel fuel (e.g., a diesel engine). However, it is to be understood the other fuel sources can be employed. More particularly, examples of suitable fuel sources include hydrocarbon fuels such as gasoline, diesel, ethanol, methanol, kerosene, and the like; gaseous fuels, such as natural gas, propane, butane, and the like; and alternative fuels, such as hydrogen, biofuels, dimethyl ether, and the like; as well as combinations comprising at least one of the foregoing fuels.

Exhaust from the exhaust source 12 is treated in the exhaust treatment device(s). Each of the exhaust treatment devices can be disposed in fluid communication with the exhaust source 12. The arrangement of one given exhaust treatment device relative to another exhaust treatment device can depend on the application of the system. Generally, each exhaust treatment device can comprise a substrate disposed within a housing. A catalyst metal and catalyst support material can be disposed on/in/throughout (hereinafter "on" the substrate for convenience in discussion) the substrate depending on the given device and application. For example, oxidation catalyst 14 can comprise a catalytic metal(s), support material(s), and a substrate(s) disposed within a housing. Optionally, a retention material can be disposed between the substrate and the housing. The catalytic metal and support material can be washcoated, imbibed, impregnated, physisorbed, chemisorbed, precipitated, or otherwise applied onto the substrate. Examples of catalytic metals include, but are not limited to, platinum, palladium, ruthenium, rhodium, iridium, gold, and silver, as well as oxides, alloys, salts, and mixtures comprising at least one of the foregoing metals.

The specific metals and design of the device are dependent upon the function of the particular device and its location with in the system. Possible exhaust treatment devices include catalytic converters (e.g., three-way catalysts, selective catalytic reduction catalyst, oxidation catalysts, and the like), evaporative emissions devices, scrubbing devices (e.g., hydrocarbon, sulfur, and the like), particulate filters/traps (e.g., catalyzed diesel particulate filters, and the like), adsorbers/absorbers (e.g., NOx adsorbers), plasma reactors (e.g., non-thermal plasma reactors), and the like, as well as combinations comprising at least one of the foregoing devices.

During operation of the system, the exhaust source produces exhaust that passes from the exhaust source, through the exhaust conduit 28 and into the oxidation catalyst 14. From the oxidation catalyst, the treated exhaust stream can pass through the particulate filter 18, the NOx adsorber 16, and, optionally, a selective catalytic reduction catalyst 32, prior to exiting the system.

Meanwhile, fuel and oxygen (e.g., air) are introduced to the reformer where reformate is produced. The reformate passes from the reformer, past valve 22 in reformate conduit 26. The temperature of the reformate can be monitored with temperature sensors in thermal communication with the reformate stream. Based upon a variable (e.g., temperature of the reformate, location of the reformate in the conduit, a period of time, and the like, as well as a combination comprising at least one of the foregoing), oxygen can be introduced into the reformate stream in conduit 26. Depending upon the temperature of the reformate stream and the amount of oxygen introduced, a portion of the reformate can self-combust, creating an exotherm that increases the reformate stream temperature. The reformate stream can then be introduced directly to the oxidation catalyst 14 and/or to the exhaust stream upstream of the oxidation catalyst 14, such that the reformate stream heats the oxidation catalyst, reducing the time for the oxidation catalyst to reach light-off temperature (i.e., the temperature where 50% conversion of a species in an exhaust stream is obtained (e.g., 50% conversion of any of HC, CO, and/or $NO_X$ to their respective target materials of $H_2O$, $CO_2$, and $N_2$ is obtained)). Reformate can similarly be introduced to one or more of the other exhaust treatment devices, as desired. The amount of oxygen introduced to the reformate stream can be controlled in order to control the exotherm to a desired level.

Once the system has attained operating temperatures, reformate can further be used to control the temperature of various system components. In this mode, the reformer 20, for example, based upon system variables (e.g., system operating conditions, sensor reading(s), exhaust composition, and the like, as well as combinations comprising at least one of the foregoing) can be instructed (e.g., controlled with a controller that monitors the system variables) to produce reformate. The reformate can be directed to the particular exhaust treatment device, e.g., the NOX adsorber, for regeneration. Oxygen can be introduced to the reformate stream to generate an exotherm that will facilitate increasing the temperature of the NOx adsorber to regeneration temperatures, while the remaining portion of the reformate regenerates the NOx adsorber.

The reformer can also be employed to produce reformate when a and exhaust treatment device's temperature decreases below a predetermined level. Again, in this situation, oxygen can be introduced to the reformate stream. The reformate and hydrogen can self-ignite (if the temperature is appropriate), and/or an igniter can be employed.

Optionally, a flame holder can be employed (e.g., in the reformate conduit), for example, to control and/or manage the combustion. The exotherm produced in the reformate stream can be employed to heat the exhaust treatment device(s). This flame holder can be used to control the location of the correct air to fuel (A/F) ratio for ignition. It can also control and/or shape a temperature distribution in front of an exhaust treatment device being heated, thereby enhancing the temperature control.

EXAMPLE

Referring now to FIG. 3, a graphical representation of hydrogen production rate (expressed as mole percent (mole %) of the reformate) and the temperature of a reformer outlet (expressed in degrees Celsius (° C.) as a function of time for a bench test of a cold-start of the reformer was illustrated. Air supplied to the reformer was preheated to 85° C. Without being bound by theory, it was noted that because of the thermal mass of the reformer (especially the reformer catalyst) that a significant amount (e.g., greater than or equal to 10 mol % hydrogen) was available prior to the reformer producing sensible heat. Stated another way, hydrogen was available for combustion before the outlet temperature of reformer had reached a normal operating temperature (e.g., a temperature of about 600° C. to about 700° C.). Hence, at less than 10 seconds, hydrogen is available for combustion, and therefore, for heating the exhaust treatment device.

Figure 4:
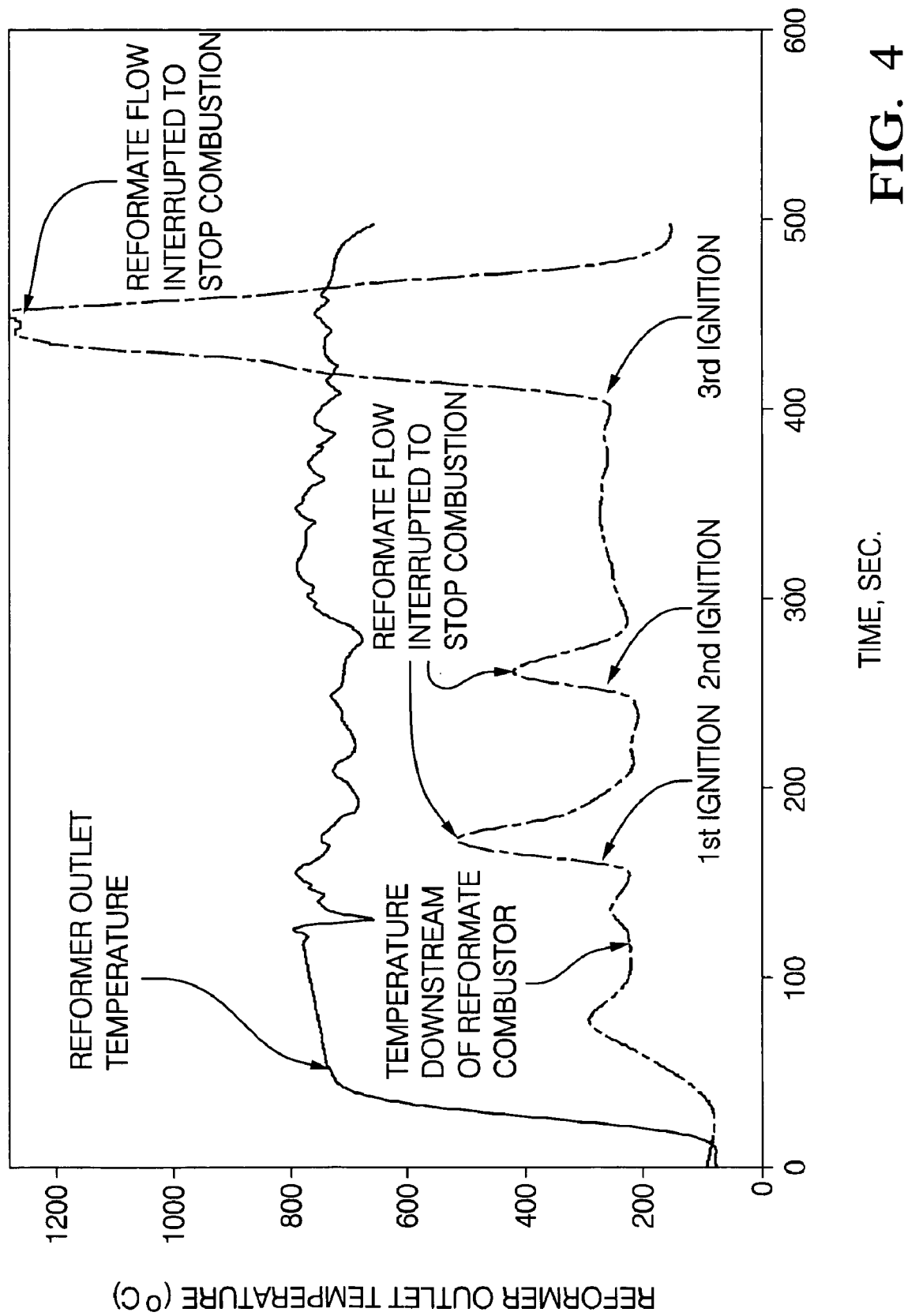
FIG. 4 is a graphical representation of heat release from combustion of reformate.

FIG. 4 is a graphical representation of temperatures before and after a combustor burning reformate and air. In this test, the reformer was cold-started under the same conditions discussed above with regards to FIG. 3. Air and reformate entered a combustor at a temperature of about 200° C. The mixture of air was ignited with a spark plug in the combustor three separate times with the flow of reformate being interrupted to stop the combustion. Without being bound by theory, this figure illustrated that by combusting air and reformate, an exotherm can be generated downstream of a reformer, which can be used to heat an exhaust treatment device. Moreover, it was noted that the control of air and/or reformer can control the magnitude of the exotherm.

Figure 5:
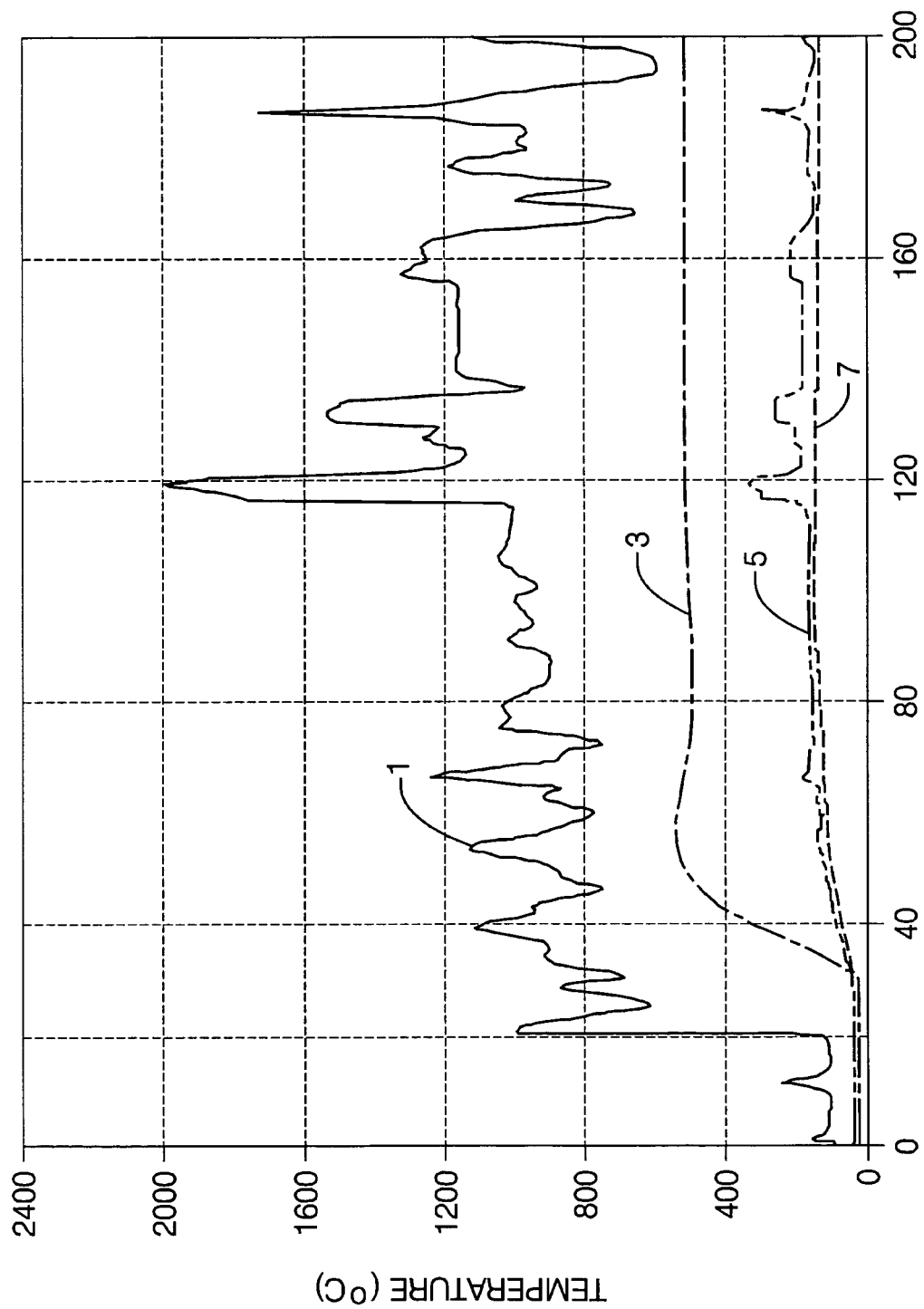
FIG. 5 is a graphical illustration of the temperature of various exhaust components and their affects.

FIG. 5 indicates the predicted temperature rise in the exhaust of a 6.6 liter diesel engine when reformate is introduced at approximately 5 grams per second (g/s), and also after reformate is ignited. The lines in the graph represent the reformate after combustion (line 1), the reformation (line 3), the reformate and exhaust after mixing (line 5), and the exhaust (line 7). A relatively small temperature increase is noted due to the heat from the reformate. However, the ignition of reformate results in a very large increase in exhaust gas temperature that would heat the downstream exhaust components above their respective catalyst light-off temperatures faster than the reformate alone.

The present exhaust system and method enable the use of reformate to heat, maintain, and/or control the temperature of exhaust treatment devices; by combusting reformate in the reformate stream, heat can be produced not only by the reforming process, but also by the combustion of reformate. The reformate temperature can be adjusted with a controlled burn of a portion of the reformate via the addition of oxygen. Depending upon where the oxygen is introduced in the reformate stream and upon the amount of oxygen introduced, a self-igniting combustion that generates an exotherm can be attained. This heat can be produced during start-up and/or at any point during operation of the system, thereby providing a heat source to control the temperature of various exhaust treatment devices, as desired. For example, this process can be employed during some operating conditions (e.g., start-up conditions, idle conditions, low speed/load points, cleaning and/or maintenance of exhaust treatment device(s) (such as desulfation, regeneration of the NOx adsorber, particulate filter burnout, and the like). In other words, if the temperature of the exhaust treatment device is lower than desired for the particular application (normal operation, regeneration, maintenance, cleaning, etc.), the temperature can be increased. Without being bound by theory, burning reformate can advantageously supply heat to a given exhaust treatment device over a wide range of operating conditions to level the temperature of the exhaust treatment device, thereby allowing the exhaust treatment device to operate in the temperature window that maximizes its performance.

Use of the reformate to heat and/or control the temperature of various exhaust treatment device(s) can also enable a reduction in the size of those devices. For example, a reduction of the NOx adsorber catalyst volume is possible by burning reformate during the cold start of the engine, as the catalyst temperature can be raised to a point that permits NOx storage faster than the heat from the exhaust alone. NOx will typically begin storing on the NOx adsorber catalyst above 150° C.

It is noted that the terms "first,""second"..., "primary," "secondary"..., and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of heating an exhaust treatment device, comprising:
   generating reformate in a reformer, wherein the reformate comprises hydrogen;
   monitoring a temperature of the reformate as the reformate passes through a reformate conduit;
   introducing oxygen to the reformate before the temperature of the reformate decreases below a self-ignite temperature and prior to combining the reformate with another stream;
   combusting a portion of the reformate and generating an exotherm to form heated reformate; and
   introducing the heated reformate to the exhaust treatment device.

2. The method of claim 1, further comprising introducing a selected amount of the oxygen to the reformate to attain a predetermined exotherm.

3. The method of claim 1, further comprising igniting the reformate with an igniter to initiate the combusting of the portion.

4. The method of claim 1, wherein the combustion is self-ignited.

5. The method of claim 1, further comprising monitoring a device temperature of the exhaust treatment device, and when the device temperature is below a selected temperature, introducing the heated reformate.

6. The method of claim 1, further comprising controlling the combusting with a flame holder.

7. A method of heating an exhaust treatment device, comprising:
   generating reformate in a reformer, wherein the reformate comprises hydrogen;
   passing the reformate through a reformate conduit;
   providing a plurality of points for introducing oxygen into the reformate conduit;
   monitoring a temperature of the reformate at the plurality of points in the reformate conduit;
   introducing oxygen to the reformate through at least one of the plurality of introduction points before the temperature of the reformate decreases below a self-ignite temperature and prior to combining the reformate with another stream;
   combusting a portion of the reformate and generating an exotherm to form heated reformate; and
   introducing the heated reformate to the exhaust treatment device.

8. The method of claim 1, wherein the step of monitoring the temperature of the reformate occurs downstream of the reformer.

9. The method of claim 1, wherein the oxygen introduced to the reformate is gaseous oxygen.

10. The method of claim 7, wherein the plurality of points are located downstream of the reformer.

11. The method of claim 7, wherein the oxygen introduced to the reformate is gaseous oxygen.

* * * * *